United States Patent Office 3,467,708
Patented Sept. 16, 1969

3,467,708
ARYL-SUBSTITUTED ALIPHATIC BENZYL AND NAPHTHYL-METHYLENE QUATERNARY AMMONIUM COMPOUNDS
Eugene J. Miller, Jr., Wheaton, and Harlan E. Tiefenthal, Western Springs, Ill., assignors, by mesne assignments, to Armour Industrial Chemical Company, a corporation of Delaware
No Drawing. Continuation-in-part of applications Ser. No. 500,203, Oct. 21, 1965 and Ser. No. 502,563, Oct. 22, 1965. This application Nov. 10, 1966, Ser. No. 593,322
Int. Cl. C07c 87/68
U.S. Cl. 260—567.6                 10 Claims

ABSTRACT OF THE DISCLOSURE

Aryl-substituted aliphatic benzyl and naphthyl-methylene quaternary ammonium compounds having 1 to 2 long chain alkyl groups to which an aryl group is attached to an internal carbon atom, useful as cationic bituminous emulsifiers and for fabric treating and in textile processing.

---

This application is a continuation-in-part of co-pending application Ser. No. 500,203, filed Oct. 21, 1965 now issued on May 13, 1969 as U.S. Patent 3,444,200 and of application Ser. No. 502,563 filed Oct. 22, 1965, now abandoned and refiled as Ser. No. 731,695, May 24, 1968.

This invention relates to a novel class of aryl-substituted aliphatic benzyl and naphthyl-methylene quaternary ammonium compounds and process for their preparation. More particularly, this invention relates to quaternary compounds containing a nitrogen-bonded benzyl or naphthyl-methylene group and one or more long chain aliphatic groups to which an aryl group is attached as a side chain, thereby providing an aralkyl group.

The compounds of this invention have utility as cationic emulsifiers for preparing asphalt or other bituminous emulsions. The compounds may also be used for other purposes, such as for fabric treatment and in textile processing.

The quaternary compounds of the present invention can be represented by the following structural formula:

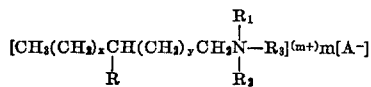

wherein R is an aryl group selected from phenyl, naphthyl, and phenyl substituted with from 1 to 2 groups selected from methyl, hydroxy, methoxy and phenoxy; $x$ and $y$ are integers from 0 to 19 and the total of $x$ plus $y$ is an integer from 8 to 19; $R_1$ and $R_2$ are selected from (1) alkyls of 1 to 3 carbons, (2) $-(CH_2CH_2O)_pH$ for $R_1$ and $-(CH_2CH_2O)_rH$ for $R_2$, (3)
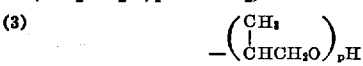
for $R_1$ and
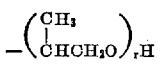
for $R_2$ and (4)
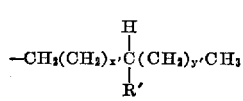

for $R_2$ where $R_1$ is selected from (A) alkyls of 1 to 3 carbons, (B) $-(CH_2CH_2O)_pH$, and (C)

wherein $p$ and $r$ are integers from 1 to 40 and with the total of $p$ and $r$ not exceeding 60, $x'$ and $y'$ are each an integer as defined for $x$ and $y$ above, and $R'$ is selected from R as defined above and H; $R_3$ is selected from (1)
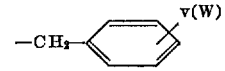

(2)
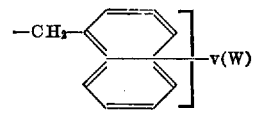

and (3)
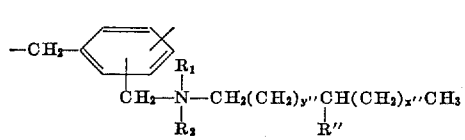

wherein W is selected from halogen and alkyl, $v$ an integer from 0 to 2, $R_1$ and $R_2$, have the meanings previously defined, $R''$ is selected from R as defined above and H, and $x''$ and $y''$ are each an integer as defined for $x$ and $y$ above; and A is an anion having a valence of 1 to 2, $m$ is an integer from 1 to 2 equaling the number of quaternary nitrogens of the cation, the anion A being present in the molar proportion to provide negative valences equaling the positive valences of the cation.

When $v$ is 0, the aromatic ring is unsubstituted by halogen or alkyl. The aromatic rings may be substituted with one or two halogens, specifically chlorine, bromine, or iodine, or with one or two alkyls of 1 to 5 carbons, or with one alkyl of 6 to 22 carbons. Thus, when W is halogen or a $C_1$ to $C_5$ alkyl, $v$ can be either one or two but when W is a $C_6$ to $C_{22}$ alkyl, such as a $C_{12}$ to $C_{18}$ alkyl, $v$ is always one.

In a preferred subclass, $p$ and $r$ are integers from 1 to 20 with the total of $p$ plus $r$ not exceeding 30.

In a preferred subclass, $R_3$ is benzyl, or benzyl ring-substituted with 1 to 2 chlorines, 1 to 2 $C_1$ to $C_3$ alkyl groups, or one $C_8$ to $C_{18}$ alkyl groups. $R_1$ and $R_2$ can be as defined below.

In one subclass, $R_1$ and $R_2$ are methyl. In another subclass, $R_1$ is $-(CH_2CH_2O)_pH$, and $R_2$ is
$-(CH_2CH_2O)_rH$
with $p$ and $r$ being integers from 1 to 20 and with the total of $p$ and $r$ not exceeding 30. In these subclasses, the other variables have the meanings previously defined, and in a preferred subclass R is phenyl, $m$ is 1, and A is chloride.

In another related embodiment, $R_1$ is

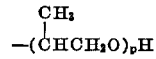

and $R_2$ is

with $p$ and $r$ being integers from 1 to 20 and with the total of $p$ and $r$ not exceeding 30. The other variables have the meanings previously defined, and in a preferred subclass R is phenyl, $m$ is 1, and A is chloride.

It will be noted from the foregoing formula that the quaternary compounds contain one or more long chain aryl-substituted aliphatic groups, or, more specifically, aralkyl groups. In one specific embodiment the alkyl portions of the aralkyl groups contain a total of 18 carbons. In other specific embodiments, the alkyl portion of the aralkyl groups contain 11, 16 or 22 carbons. More generally, the total of $x$ and $y$, which is three less than the total of carbons in the alkyl portion of the aralkyl, may range from 8 to 19. The compounds also contain one to two alkyl or alkoxy groups which are bonded to the nitrogen atoms. While methyl groups are preferred, the alkyl or alkoxy groups may also comprise ethyl, propyl, ethoxy, propoxy.

In the formulas, R represents the aryl substituents. The carbon to which the aryl group is attached varies with the respective values of $x$ and $y$. With unsaturated alkylene chains, such as oleyl, under most reaction conditions the double bond migrates up and down the chain (isomerization by hydrogen ion transfer) resulting in a mixture of isomeric products. In arylating oleyl, there is a tendency for the $C_8$–$C_{14}$ and the $C_{17}$ aryl isomers to predominate, but smaller mole percentages of other isomers, such as the $C_6$, $C_7$, $C_{15}$, and $C_{16}$ isomers are also produced. The mole percent of the $C_2$–$C_5$ isomers is usually quite small or even negligible. The relative proportions of the various isomers may vary depending on the arylation process. See J. Org. Chem. 30, 885–888 (1965). However, the total of $x$ and $y$ will remain constant for the particular unsaturated chain, viz 15 for oleyl, 8 for undecyl, 19 for behenyl, etc. By arylation, oleic acid is converted to aryl-substituted stearic acid. Similarly, palmitoleic, erucic, and 10-undecenoic acids can be converted to the corresponding aryl-substituted carboxylic acids. Ordinary commercial grade oleic acid contains several percent of palmitoleic acid, and therefor a mixture of aryl-substituted stearic and palmitic acids is obtained by arylation.

Among the preferred aryl substituents on the aliphatic group are phenyl, hydroxyphenyl, tolyl, anisyl, and naphthyl. The phenyl nucleus may be substituted with 1 or 2 groups such as methyl, hydroxy, methoxy and phenoxy. Examples of aryl substituents coming within this subclass are cresyl, resorcyl, and xylyl.

Since quaternaries are in the form of salts, the cationic portion of the molecule will be associated with an anionic portion. The particular anion is not critical, and generally the anion may be any of those which are commonly present in quaternary compounds, such as monovalent or divalent anions. It will be understood that the anion will be present in the molar proportion to provide negative valences equaling the number of quaternary nitrogens which may be 1 or 2, but preferably 1. Chloride salts of the quaternaries are particularly desirable where the compounds are to be employed as cationic emulsifiers, but other salts can be prepared such as hydroxide, sulfate, nitrate, hydrochlorate, perchlorate, hypochlorate, formate, acetate, and other halides such as bromide.

The quaternary ammonium compounds of our invention may be formed from arylaliphatic tertiary amines by quaternization using a suitable aromatic quaternizing agent such as benzyl chloride, ring-substituted benzyl chlorides, bis(chloromethyl)benzene, ring - substituted bis(chloromethyl)benzene, chloromethyl naphthalene, ring-substituted chloromethyl naphthalene, etc. Where one chloromethyl group is attached to the aromatic nucleus (e.g. phenyl or naphthyl), a monoquaternary will be formed. When using quaternizing reagents, such as bis(chloromethyl)benzene, a diquaternary is formed. Such arylaliphatic tertiary amine reactants may be derived from an unsaturated fatty acid.

Aryl fatty acids, such as arylstearic acid or arylpalmitic acid, may be prepared by the arylation of the corresponding unsaturated fatty acid (e.g., oleic acid or palmitoleic acid). A catalyst is ordinarily required for such arylation, as is well known in the art. For example, aluminum chloride may be employed as the catalyst. With this process, the fatty acid is preferably first converted to the cyano or nitrile derivative, which is then reacted with the arylating agent in the presence of aluminum chloride. The aryl cyanoaliphatic compound can then be reduced to the corresponding primary amine by hydrogenation in the presence of a catalyst such as Raney nickel.

For direct arylation of unsaturated acids other catalysts are preferred, such as acid activated clays, or hydrofluoric acid. A process employing an activated clay is described in U.S. Patent 3,074,983, while use of hydrofluoric acid is described in U.S. Patent 2,275,312. An improved process utilizing hydrofluoric acid is described and claimed in the copending application, Ser. No. 451,021, filed Apr. 26, 1965, entitled "Process for Arylating Unsaturated Fatty Compounds," now abandoned and refiled as Ser. No. 679,251, filed Oct. 30, 1967.

Such arylaliphatic acids may be converted to primary and secondary amines.

Reference to a specific example illustrating the synthesis of an arylaliphatic primary amine follows:

Example I

Phenylstearic acid was prepared from commercial grade oleic acid which contained a few percent of palmitoleic acid by a Friedel-Crafts reaction using hydrofluoric acid as the catalyst and benzene as the arylating agent. Thereafter, phenylstearonitrile was prepared on a continuous nitrile unit over bauxite catalyst at 280–300° C. from 1127 gms. of phenylstearic acid. A crude yield of 833.5 gms. of phenylstearonitrile was obtained comprising a mixture of isomers with respect to location of the phenyl group, predominately the $C_8$ to $C_{14}$, and the $C_{17}$ isomers with lesser proportions of other isomers.

Phenylstearonitrile (591 gms.) was reduced in a 1-liter, Parr autoclave over 2% (by wt.) alcohol washed Raney nickel catalyst in the presence of ammonia (150 p.s.i. at 30–40° C.) and hydrogen (800 p.s.i. total pressure at 125° C.) for 4–5 hours. The product was obtained as a light amber oil, 582.3 gms. (97% crude yield). Phenyloctadecylamine was obtained in 67% yield upon distillation at 183–190° C. at 0.3 mm.

Di-arylaliphatic secondary amines may be obtained from arylaliphatic nitriles by reduction under hydrogen pressure at about 200° C. in the presence of Raney nickel or other hydrogenation catalysts such as copper chromite. These compounds and the process for their production are described in our copending application, Ser. No. 585,751, filed Oct. 11, 1966, entitled "Aryl-Substituted Aliphatic Secondary Amines." All of the di-arylaliphatic secondary mono amines described in this patent application are among the suitable reactants to form the tertiary amines from which to prepare the quaternary ammonium compounds of our invention. Reference to a specific example illustrating the synthesis of a di-arylaliphatic secondary amine follows:

Example II

A one-liter Magne-dash autoclave was charged with 552.3 gms. (1.62 moles) phenyloctadecylnitrile and 19.6 gms. (3% by wt.) copper chromite catalyst. The reactor was flushed with hydrogen and the temperature raised to 195° C. Hydrogen pressure was maintained at 200 p.s.i.g. with continuous bleeding and the temperature maintained at about 195–200° C. After 28 hours of reaction, the mixture was cooled and filtered to yield 525.1 gms. (96.2% mass yield) of viscous amber oil, analysed as follows:

Neutralization equivalent (calc'd 674) _____ 710
Primary amine _____ Nil
Di-(phenyloctadecyl) amine, percent _____ 93.7
Tertiary amine, percent _____ 2.7

Aryl-substituted aliphatic primary and secondary amines can be converted to corresponding mono-tertiary amines, by alkylation or alkoxylation as described in our copending application, Ser. No. 590,474, filed Oct. 31, 1966, entitled "Aryl-Substituted Aliphatic Tertiary Amines." All of the mono-tertiary amine compounds described in this patent application are among suitable reactants to form the aryl-substituted aliphatic benzyl and naphthyl-methylene quaternary compounds of our invention.

The alkylated arylalkyl tertiary amines can be prepared by reductive alkylation of the above-mentioned arylaliphatic amines with aldehydes in the presence of a hydrogen source and heat from about 50–150° C. When hydrogen is supplied directly, a hydrogenation catalyst such as Raney nickel is preferably employed. An example of a chemical hydrogen source is formic acid.

The alkoxylated arylalkyl tertiary amines can be prepared by reacting the above-mentioned arylaliphatic amines with an alkylene oxide at about 50–200° C. and a pressure of about 0–100 p.s.i.g. Preferably the reaction temperature is from about 100–150° C. and pressure preferably less than 50 p.s.i.g. For example, the amine can be reacted with ethylene oxide or propylene oxide and it is understood that the ethylene or propylene oxide for reaction with the amine will distribute between the $R_1$, and $R_2$ groups.

A specific example illustrating the preparation of a tertiary amine compound follows:

Example III

A 300-ml. stainless steel, stirred autoclave was charged with phenylstearylamine (97.3 gms., 0.284 mole), glacial acetic acid (1 ml.) and Raney nickel catalyst (2 gms. alcohol washed). The temperature was raised to 115° C. and hydrogen added under pressure to 175 p.s.i. while maintaining a continuous vent. Formacel (45–55% solution of formaldehyde in methanol) was then pumped in slowly. At 8 ml., 17 ml., 24 ml., and 30 ml. of Formacel added, the pumping was stopped and the vessel vented to 0 p.s.i. After 30 ml. of Formacel had been added, a sample was analyzed and 0.5 ml. additional Formacel was added to complete the reaction. The reaction mixture was filtered to give crude N,N-dimethyl phenylstearylamine in 90.5% yield. Distillation afforded the tertiary amine in 68.7% yield having the following analysis:

| | |
|---|---|
| Neutralization equivalent (calc'd 373) | 372 |
| Primary amine, percent | 1.38 |
| Secondary amine, percent | 1.44 |
| Tertiary amine, percent | 97.2 |

The aryl-substituted aliphatic benzyl and naphthylmethylene quaternary compounds of our invention can be produced by reaction of aryl-substituted aliphatic tertiary amines represented by the formula

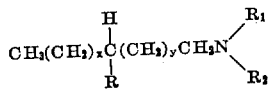

wherein $x$ and $y$ are integers from 0 to 19 and the total of $x$ and $y$ is an integer from 8 to 19; R is an aryl group selected from phenyl, naphthyl, and phenyl substituted with from 1 to 2 groups selected from methyl, hydroxy, methoxy, and phenoxy; $R_1$ and $R_2$ are selected from (1) alkyls of 1 to 3 carbons, (2) —(CH$_2$CH$_2$O)$_p$H for $R_1$ and —(CH$_2$CH$_2$O)$_r$H for $R_2$, (3)

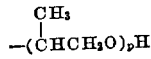

for $R_1$ and

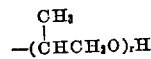

for $R_2$, and (4)

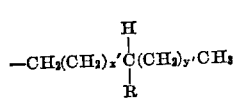

for $R_2$ where $R_1$ is selected from (A) alkyls of 1 to 3 carbons, (B) —(CH$_2$CH$_2$O)$_p$H, and (C)—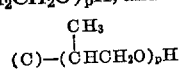

wherein $p$ and $r$ are integers from 1 to 40 with the total of $p$ plus $r$ not exceeding 60, $x'$ and $y'$ are integers as defined for $x$ and $y$ above, and R' is selected from R and H; with a quaternizing agent selected from the group consisting of benzyl chloride, ring-substituted benzyl chloride, bis(chloromethyl) benzene, ring-substituted bis(chloromethyl) benzene, chloromethyl naphthalene, and ring-substituted chloromethyl naphthalene, at a temperature of from 25 to 150° C. at autogenous pressure. Preferred reaction temperatures are from 60 to 80° C. and autogenous from about 0 to 250 p.s.i.g. The time of reaction may vary from about 30 minutes to 24 hours, but is generally from about 2 to 6 hours.

This invention is further illustrated by the following specific examples. From what has been said above, it will be understood that the products of the examples are in the form of isomeric mixtures.

Example IV

A 500 ml. three-neck flask, equipped with a thermometer, addition funnel, condenser and mechanical stirrer, was charged with 60.0 g. (0.15 mole) of N,N-dimethyl tolyloctadecylamine and 15.5 g. of ethylene glycol. The mixture was heated to 60° C. and 19.6 g. (0.15 mole) of benzyl chloride was added over a one hour period at 60–65° C. Heating was continued for one additional hour at 60–65° C. and allowed to stand overnight. The product, N,N - dimethyl-N-benzyl-N-tolyloctadecylammonium chloride, was diluted with about 40 ml. of water to give a pale yellow solution having the following analysis:

| | Percent |
|---|---|
| Quaternary | 37.9 |
| Free amine | 0.6 |

Example V

A 300 ml. three-neck flask, equipped with a thermometer, reflux condenser, addition funnel and magnetic stirrer, was charged with 21.6 g. (0.05 mole) of N-N-dimethyl phenyldocosylamine and 21.6 g. of ethylene glycol. The mixture was heated to 69° C. and 6.4 g. (0.05 mole) of benzyl chloride was added over a one hour period. The reaction mixture was then allowed to stir overnight at 69° C. N,N-dimethyl-N-benzyl-N-phenyl docosylammonium chloride was obtained in an ethylene glycol solution having the following analysis:

| | Percent |
|---|---|
| Quaternary | 53.9 |
| Free amine | 1.3 |

Example VI

A 500 ml. three-neck flask, equipped with a thermometer, reflux condenser, addition funnel and magnetic stirrer, was charged with 55.8 g. (0.2 mole) of N,N-dimethyl phenylundecylamine and 55.8 g. of ethylene glycol. The mixture was heated to 70–80° C. and 25.7 g. (0.2 mole) of benzyl chloride was added over a 45 minute period. The reaction mixture was then allowed to stir overnight at 80° C. N,N-dimethyl-N-benzyl-N-phenylundecylammonium chloride was obtained in an ethylene glycol solution having the following analysis:

| | Percent |
|---|---|
| Quaternary | 55.0 |
| Free amine | 0.28 |

Example VII

A 250 ml. three-neck round bottom flask, equipped with a thermometer, addition funnel, condenser and stirrer was charged with 28.4 g. (0.056 mole) of N,N-di(beta-hydroxyethyl) tolyloctadecylamine and 40 ml. of isopropanol. The mixture was heated to 60° C. with stirring and 7.1 g. (0.056 mole) of benzyl chloride added over a five hour period. The mixture was then heated at 60–65° C. for four hours and at 80–85° C. for an additional twelve hours. The product, N,N-di(beta-hydroxyethyl)-benzyl-N-benzyl-N-tolyloctadecylammonium chloride, was obtained as a red isopropanol solution having the following analysis:

| | Percent |
|---|---|
| Quaternary | 37.2 |
| Free amine | 6.8 |

Example VIII

A 250 ml. three-neck flask, equipped with a thermometer, addition funnel, condenser and mechanical stirrer, was charged with 81.4 g. (0.21 mole) of N,N-dimethyltolyloctadecylamine, 35.5 g. of methanol and 7.1 g. (5% by wt.) of sodium bicarbonate. The mixture was heated to 65° C. and 24.8 g. (0.11 mole) were added over a period of one hour of bis(chloromethyl)alkylbenzene in which the alkyl groups are a mixture of methyl, ethyl, and isopropyl groups. Heating was continued for an additional two hours at 73° C. The mixture was filtered to give a yellow solution having the following analysis:

| | Percent |
|---|---|
| Quaternary | 42.5 |
| Free amine | 4.4 |
| Amine—HCl | Nil |

The quaternary compounds were N,N,N',N'-tetramethyl - N,N' - di(tolyloctadecyl)-alkylxylylene diammonium dichlorides.

Example IX

A 250 ml. three-neck flask, equipped with a thermometer, addition funnel, condenser and mechanical stirrer, was charged with 40.7 g. (0.1 mole) of N,N-dimethyltolyloctadecylamine, 20.4 g. of methanol and 4.1 g. (5% by wt.) of sodium bicarbonate. The mixture was heated to 75° C. and 23.1 g. (0.11 mole) of chloromethyl methylnaphthalene was added over one hour at 70-80° C. Heating was continued for two additional hours and the mixture was filtered to give a yellow solution having the following analysis:

| | Percent |
|---|---|
| Quaternary | 55.6 |
| Free amine | 3.3 |
| Amine—HCl | Nil |

The quaternary product was N,N-dimethyl-N-(methylnaphthylmethyl)-N-tolyloctadecylammonium chloride.

Example X

A 250 ml. three-neck flask, equipped with a thermometer, addition funnel, condenser and mechanical stirrer, was charged with 80.0 g. (0.20 mole) of N,N-dimethyltolyl-octadecylamine, 55 ml. of isopropanol and 8.2 g. (5% by wt.) of sodium bicarbonate. The mixture was heated to 70-80° C. and 43.0 g. (0.22 mole) of 2.4-dichlorobenzyl chloride was added over one and a half hours at 70-80° C. Heating was continued for an additional hour and the mixture was filtered to give a yellow solution having the following analysis:

| | Percent |
|---|---|
| Quaternary | 64.9 |
| Free amine | 1.2 |
| Amine—HCl | 0.1 |

The quaternary product was N,N-dimethyl-N-(2,4-dichlorobenzyl)-N-tolyloctadecylammonium chloride.

Example XI

A 250 ml. three-neck flask, equipped with a thermometer, addition funnel, condenser and mechanical stirrer, was charged with 40.0 g. (0.1 mole) of N,N-dimethyltolyloctadecylamine, 27 ml. of isopropanol and 4.1 g. (5% by wt.) of sodium bicarbonate. The mixture was heated to 70-80° C. and 21.5 g. (0.11 mole) of 3,4-dichlorobenzyl chloride was added over one hour at 70-80° C. Heating was continued for an additional one and a half hours and the mixture was filtered to give a yellow solution having the following analysis:

| | Percent |
|---|---|
| Quaternary | 55.1 |
| Free amine | 1.0 |
| Amine—HCl | Trace |

The quaternary product was N,N-dimethyl-N-(3,4-dichlorobenzyl)-N-tolyloctadecylammonium chloride.

Example XII

A 250 ml. three-neck flesk, equipped with a thermometer, addition funnel, condenser and mechanical stirrer, was charged with 80.0 g. (0.20 mole) of N,N-dimethyltolyloctadecylamine, 40 ml. of isopropanol and 7.9 g. (5% by wt.) of sodium bicarbonate. The mixture was heated to 70-80° C. and 38.5 g. (0.22 mole) of chloromethylalkylbenzene in which the alkyl groups are a mixture of methyl, ethyl and isopropyl groups, was added over one and a half hours at 70-80° C. Heating was continued for two additional hours and the mixture was filtered to give a yellow solution having the following analysis:

| | Percent |
|---|---|
| Quaternary | 62.4 |
| Free amine | 0.8 |
| Amine—HCl | 0.1 |

The quaternary products were N,N-dimethyl-N-alkylbenzyl-N-tolyloctadecylammonium chlorides.

Example XIII

A 100 ml. three-neck flask equipped with thermometer, condenser and magnetic stirrer was charged with 22.5 g. (0.0685 mole) of N,N-dimethyl phenylundecylamine, 20.0 g. (0.0685 mole) of dodecylbenzyl chloride and about 25 ml. of isopropanol. The mixture was heated 70-80° C. overnight and a solution was obtained having the following analysis:

| | Percent |
|---|---|
| Quaternary | 69.5 |
| Free amine | 1.99 |
| Amine—HCl | 0.36 |

The quaternary product was N,N-dimethyl-N-dodecylbenzyl-N-phenylundecylammonium chloride.

Example XIV

A 250 ml. three-neck flask equipped with a thermometer, addition funnel, condenser and magnetic stirrer, was charged with 34.4 g. (0.0522 mole) of N-methyl-N,N-di-(phenyloctadecyl) amine and 52 ml. of isopropanol. The mixture was heated to 65° C. and 7.03 g. (0.055 mole) of benzyl chloride was added over a 45 minute period at 65-70° C. The heating was continued for an additional 18 hours to give an isopropanol solution of N-methyl-N-benzyl-N,N-di-(phenyloctadecyl)ammonium chloride having the following analysis:

| | Percent |
|---|---|
| Quaternary | 45.4 |
| Free amine | Trace |
| Amine—HCl | 1.15 |

Example XV

A 250 ml. three-neck flask, equipped with a thermometer, addition funnel, condenser and magnetic stirrer, was charged with 21.4 g. (0.034 mole) of partially ethoxylated N,N-di-phenyloctadecyl amine (neutral equiv. 690, semondary amine 75%, tertiary amine 25%) and 25 g. of isopropanol. The mixture was heated to 65° C. and 4.03 g. (0.036 mole) of benzyl chloride was added over a 35 minutes period at 65-70° C. The heating was continued for an additional 18 hours to give an isopropanol solution containing N-ethoxy-N-benzyl-N,N-di-(phenyloctadecyl)ammonium chloride having the following analysis:

| | Percent |
|---|---|
| Quaternary | 8.2 |
| Free amine | 16.2 |
| Amine—HCl | 23.2 |

Example XVI

N,N-dimethyl phenyloctadecylamine as prepared in Example III can be converted to N,N-dimethyl-N-benzyl-N-phenyloctadecylammonium chloride by the process of Example IV, or to corresponding quaternary compounds using as quaternizing agents bis(chloromethyl) alkylbenzene, chloromethyl methylnaphthalene, 2,4-dichlorobenzyl chloride, 3,4-dichlorobenzyl chloride, or chloromethylalkylbenzene according to the processes, respectively, of Examples VII, IX, V, XI, and XII.

We claim:

1. Quaternary ammonium compounds represented by the formula

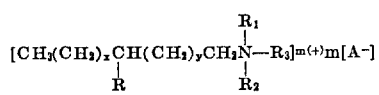

wherein R is selected from phenyl, naphthyl, and phenyl-substituted with from 1 to 2 groups selected from methyl, hydroxy, and methoxy; $x$ and $y$ are integers of 0 to 19 and the sum of $x$ and $y$ is an integer of 8 to 19; $R_1$ is selected from the group consisting of alkyl radicals having from 1 to 3 carbon atoms,

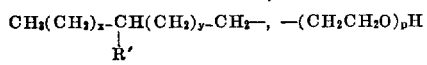

and $R_2$ is selected from the group consisting of alkyl radicals having from 1 to 3 carbon atoms, $$-(CH_2CH_2O)_rH$$

and

wherein $p$ and $r$ are integers from 1 to 40 and the sum of $p$ and $r$ is less than 60, $x'$ and $y'$ are each an integer as defined for $x$ and $y$ above and $R'$ is selected from the group defined for R above and H; $R_3$ is selected from (1) 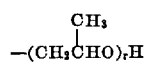

(2) 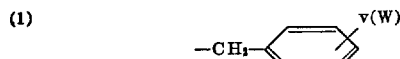

and (3) 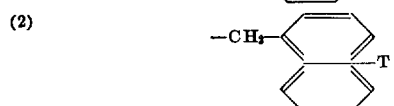

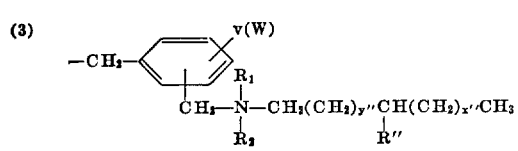

wherein $v$ is an integer from 0 to 2, W is selected from chlorine, bromine, iodine and alkyl having from 1 to 22 carbon atoms provided that when $v$ is 2, W is selected from chlorine, bromine, iodine and alkyl having from 1 to 5 carbon atoms, T is selected from chlorine, bromine, iodine, and alkyl having 1 to 5 carbon atoms, $R_1$ and $R_2$ are selected from the groups previously defined, $R''$ is selected from the group defined above for R and H, and $x''$ and $y''$ are each integers selected from the group defined for $x$ and $y$ above; A is an anion; and $m$ is an integer from 1 to 2; said compounds comprising isomeric mixtures with respect to the position of R, R' and R'' on the alkyl chain.

2. The compounds of claim 1 wherein $x$ and $y$ are integers of 0 to 15 and the sum of $x$ and $y$ is 15.

3. The compounds of claim 1 wherein R is phenyl.

4. The compounds of claim 1 wherein R is hydroxyphenyl.

5. The compounds of claim 1 wherein A is selected from the group consisting of $Cl^-$, $SO_4^=$, $OH^-$, $NO_3^-$, and $Br^-$.

6. The compounds of claim 1 wherein $R_1$ and $R_2$ are each methyl.

7. The compounds of claim 1 wherein $R_1$ is $$-(CH_2CH_2O)_pH$$

and $R_2$ is $-(CH_2CH_2O)_rH$ wherein $p$ and $r$ are integers of 1 to 20 and the sum of $p$ and $r$ is less than 30.

8. The compounds of claim 1 wherein $R_3$ is benzyl.

9. The compounds of claim 1 wherein $R_3$ is

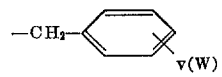

wherein W is selected from the group consisting of chlorine, bromine, iodine and alkyl radicals having 1 to 22 carbon atoms, and $v$ is 1.

10. The compounds of claim 1 wherein $R_3$ is

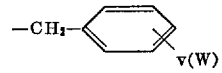

wherein W is selected from the group consisting of chlorine, bromine, iodine and alkyl radicals having 1 to 5 carbon atoms, and $v$ is 2.

References Cited

UNITED STATES PATENTS

| | | | |
|---|---|---|---|
| 2,519,999 | 8/1950 | de Benneville et al. | 260—567.6 |
| 2,520,275 | 8/1950 | Du Bois et al. | 260—567.6 |
| 3,037,910 | 6/1962 | Copp et al. | 260—567.6 X |
| 3,050,521 | 8/1962 | Niederhauser | 260—567.6 X |
| 3,205,169 | 9/1965 | Kirkpatrick et al. | 260—567.6 X |
| 3,283,005 | 11/1966 | Abend et al. | 260—567.6 |
| 3,311,659 | 3/1967 | Birkelo et al. | 260—567.6 |

FOREIGN PATENTS

| | | |
|---|---|---|
| 789,794 | 1/1958 | Great Britain. |
| 217,132 | 9/1941 | Switzerland. |
| 217,133 | 9/1941 | Switzerland. |
| 217,136 | 9/1941 | Switzerland. |
| 217,137 | 9/1941 | Switzerland. |

CHARLES B. PARKER, Primary Examiner

S. T. LAWRENCE III, Assistant Examiner

U.S. Cl. X.R.

252—8.8, 311.5; 260—413, 465, 501.15, 570.5, 570.8